(12) United States Patent
Weigand

(10) Patent No.: US 12,107,976 B2
(45) Date of Patent: Oct. 1, 2024

(54) DOCUMENT INTEGRITY PROTECTION

(71) Applicant: Cryptar Gmbh, Munich (DE)

(72) Inventor: Florian Weigand, Munich (DE)

(73) Assignee: Cryptar GmbH, Munich (DE)

( * ) Notice: Subject to any disclaimer, the term of this patent is extended or adjusted under 35 U.S.C. 154(b) by 161 days.

(21) Appl. No.: 17/895,789

(22) Filed: Aug. 25, 2022

(65) Prior Publication Data

US 2023/0060241 A1 Mar. 2, 2023

(30) Foreign Application Priority Data

Aug. 26, 2021 (DE) .................... 10 2021 122 160

(51) Int. Cl.
*H04L 9/00* (2022.01)
*H04L 9/32* (2006.01)

(52) U.S. Cl.
CPC .............. *H04L 9/50* (2022.05); *H04L 9/3247* (2013.01)

(58) Field of Classification Search
CPC ....... H04L 9/50; H04L 9/3247; H04L 9/3249; H04L 63/123; H04L 63/126; H04L 9/3239

See application file for complete search history.

(56) References Cited

U.S. PATENT DOCUMENTS

| | | | | |
|---|---|---|---|---|
| 8,719,576 | B2 * | 5/2014 | Buldas | H04L 9/3265 713/168 |
| 9,323,765 | B1 * | 4/2016 | Stefanov | G06F 16/1824 |
| 11,997,194 | B2 * | 5/2024 | Rasmussen | H04L 9/0836 |
| 2014/0245020 | A1 * | 8/2014 | Buldas | H04L 9/3242 713/177 |
| 2015/0295720 | A1 * | 10/2015 | Buldas | H04L 9/3247 713/176 |
| 2016/0092701 | A1 * | 3/2016 | Shah | H04W 4/60 713/189 |
| 2017/0357496 | A1 * | 12/2017 | Smith | H04L 9/0662 |
| 2018/0091315 | A1 * | 3/2018 | Singhal | G06F 12/0238 |
| 2018/0349621 | A1 * | 12/2018 | Schvey | G06F 21/62 |
| 2019/0171825 | A1 * | 6/2019 | Khi | H04L 9/0643 |

(Continued)

OTHER PUBLICATIONS

Pâris, Jehan-François, and Thomas Schwarz. "Merkle hash grids instead of Merkle trees." 2020 28th International Symposium on Modeling, Analysis, and Simulation of Computer and Telecommunication Systems (MASCOTS). IEEE, 2020.*

(Continued)

*Primary Examiner* — Jimmy H Tran
(74) *Attorney, Agent, or Firm* — SoCal IP Law Group LLP; Jonathan Pearce

(57) ABSTRACT

Computer-implemented methods, devices and computer programs are provided for integrity-preserving document processing. At a first layer, a first hash is generated over at least one first data object of a document and associated given random data. The first hash value is set as a leaf to an existing sparse hash tree (SHT). An updated root of the updated SHT is calculated. At a second layer, a current block is generated including a second hash value over at least the existing root of the existing SHT and at least one digital signature of the existing root of the existing SHT, at least one digital signature of at least the updated root of the updated SHT and the updated root of the updated SHT. A third hash value over current block is generated and, at a third layer, registered with a timestamp service or a blockchain.

14 Claims, 7 Drawing Sheets

(56) References Cited

U.S. PATENT DOCUMENTS

| | | | |
|---|---|---|---|
| 2019/0378162 A1* | 12/2019 | Goldberg | G06Q 30/0242 |
| 2020/0192822 A1* | 6/2020 | van Loon | G06F 12/1009 |
| 2020/0382310 A1* | 12/2020 | Jayachandran | H04L 9/3239 |
| 2021/0019418 A1* | 1/2021 | Peeters | H04L 9/3242 |
| 2021/0067330 A1* | 3/2021 | Rasmussen | H04L 9/0643 |
| 2021/0117404 A1* | 4/2021 | Irazabal | G06F 16/2365 |
| 2021/0216522 A1* | 7/2021 | Zhuo | G06F 16/9027 |
| 2021/0216528 A1* | 7/2021 | Zhuo | H04L 9/0643 |
| 2021/0234671 A1* | 7/2021 | Solan | H04L 9/0643 |
| 2021/0336789 A1* | 10/2021 | Chalkias | H04L 9/3239 |
| 2022/0078006 A1* | 3/2022 | Krishnamurthy | H04L 9/3239 |
| 2022/0311614 A1* | 9/2022 | Stolbikov | H04L 9/0825 |
| 2022/0345315 A1* | 10/2022 | Ilan | H04L 9/0643 |
| 2023/0042916 A1* | 2/2023 | Sole | G06Q 20/123 |
| 2023/0319136 A1* | 10/2023 | De La Rocha Gomez-Arevalillo et al. | H04L 9/3239 709/203 |

OTHER PUBLICATIONS

Wei, Franklin, Mahalingam Ramkumar, and Somya D. Mohanty. "A Scalable, Trustworthy Infrastructure for Collaborative Container Repositories." arXiv preprint arXiv:1810.07315 (2018).*

Lou, Shuangsheng, Nisha Panwar, and Gagan Agrawal. "Integrity Verification for Streaming IoT Applications with a Minimalist Logging Scheme." 2021 IEEE International Conference on Smart Computing (SMARTCOMP). IEEE, 2021.*

Suhail, Sabah, et al. "On the role of hash-based signatures in quantum-safe internet of things: Current solutions and future directions." IEEE Internet of Things Journal 8.1 (2020): 1-17.*

Yu, Mingchao, et al. "Coded merkle tree: Solving data availability attacks in blockchains." International Conference on Financial Cryptography and Data Security. Cham: Springer International Publishing, 2020.*

Ramabaja, Lum, and Arber Avdullahu. "The bloom tree." arXiv preprint arXiv:2002.03057 (2020).*

Jämthagen, Christopher, and Martin Hell. "Blockchain-based publishing layer for the keyless signing infrastructure." 2016 Intl IEEE Conferences on Ubiquitous Intelligence & Computing, Advanced and Trusted Computing, Scalable Computing and Communications, Cloud and Big Data Computing, Internet of People, and Smart.*

Liu, Baolong, Joan Lu, and Jim Yip. "XML data integrity based on concatenated hash function." arXiv preprint arXiv:0906.3772 (2009).*

Dahlberg et al., Efficient Sparse Merkle Trees, Catching Strategies and Secure (Non-) Membership Proofs, journal, Paper 2016/683, 2006. URL: https://eprint.iacr.org/2016/683.pdf, 16 total pages.

Wikipedia, Salt (Cryptography), https://en.wikipedia.org/wiki/Salt_(cryptography), last accessed Jun. 8, 2022.

Wikipedia, Digital Signature, https://en.wikipedia.org/wiki/Digital_signature, last accessed Jun. 8, 2022.

Intellectual Property Office of Germany, Search Report for German Application No. 10 2021 122 160.9, mail date Jun. 9, 2022, 10 total pages.

European Intellectual Property Office, Extended Search Report for European Application No. 22189589.9, mail date Jan. 20, 2023, 9 total pages.

Simm et al., Verifiable Multi-Party Business Process Automation, In: "Lecture Notes in Business Information Processing", Jan. 19, 2021 (Jan. 19, 2021), Springer Berlin Heidelberg, DE, XP055820610, ISSN: 1865-1348, pp. 30-41, DOI: 10.1007/978-3-030-66498-5_J3, Retrieved from the Internet: URL: https://m.guardtime.com/files/spbp_final.pdf.

* cited by examiner

DOCUMENT INTEGRITY PROTECTION

RELATED APPLICATION INFORMATION

This patent claims priority from German Patent Application No. 10 2021 122 160.9, filed Aug. 26, 2021 entitled, "DOCUMENT INTEGRITY PROTECTION", which is incorporated herein by reference in its entirety.

FIELD

The present disclosure generally relates to information technology. More specifically, it relates to processing documents and document content in an integrity-preserving manner and verifying the integrity of documents and document content.

BACKGROUND

A general challenge in modern information technology environments is to maintain integrity of documents. Content manipulations via image processing software by unauthorized and other attacks may cause unauthorized changes of document. Hence, security measures are taken to preserve the integrity of documents which are to be communicated between network nodes including digital signing documents by way of asymmetric key schemes.

Persistent storage of documents is likewise to be secured in order to ensure authenticity of the stored documents. Known measures include distributed file systems such as IPFS (InterPlanetary File System), authorization schemes, digital signing documents by way of asymmetric key schemes, trusted units, hardware security modules, as well as distributed ledgers including blockchains such as the Bitcoin network or the Ethereum network registering fingerprints of documents or transactions. Trusted timestamping securely keeps track of the creation and modification time of a document.

There is a general demand for mechanisms that further improve security and efficiency of integrity-preserving processing of document content.

SUMMARY

In this context, methods, systems and computer program products are presented as defined by the independent claims.

More specifically, a computer-implemented method for integrity-preserving document content processing is presented. A first document to be processed comprises at least one data object. The method processes the first document by way of activities on multiple layers. At a first layer, a first hash value is generated over the at least one first data object and given random data associated with the at least one first data object. The first hash value is set as a leaf to an existing sparse hash tree, SHT, with at least one existing leaf and an existing root, thereby forming an updated SHT. An updated root of the updated SHT is calculated. At a second layer, at least one digital signature of at least the updated root of the updated SHT is generated using at least one private key of an author of the first document. The updated root of the updated SHT and the at least one digital signature of the updated root signature are added to a current block comprising a second hash value over at least the existing root of the existing SHT and one or more digital signatures of the existing root of the existing SHT. A third hash value is generated over the updated root of the updated SHT, the one or more digital signatures of the updated root of the updated SHT and the second hash value.

Furthermore, a corresponding computing device with the aforementioned functionalities is provided.

Moreover, a computer program is presented, the execution of which causes a computer to perform the aforementioned functionalities.

Further refinements are set forth by the dependent claims.

Further aspects are apparent from the subsequent description.

BRIEF DESCRIPTION OF THE FIGURES

Aspects and examples of the present disclosure are described with reference to the following figures, in which.

DETAILED DESCRIPTION

Figure 1:
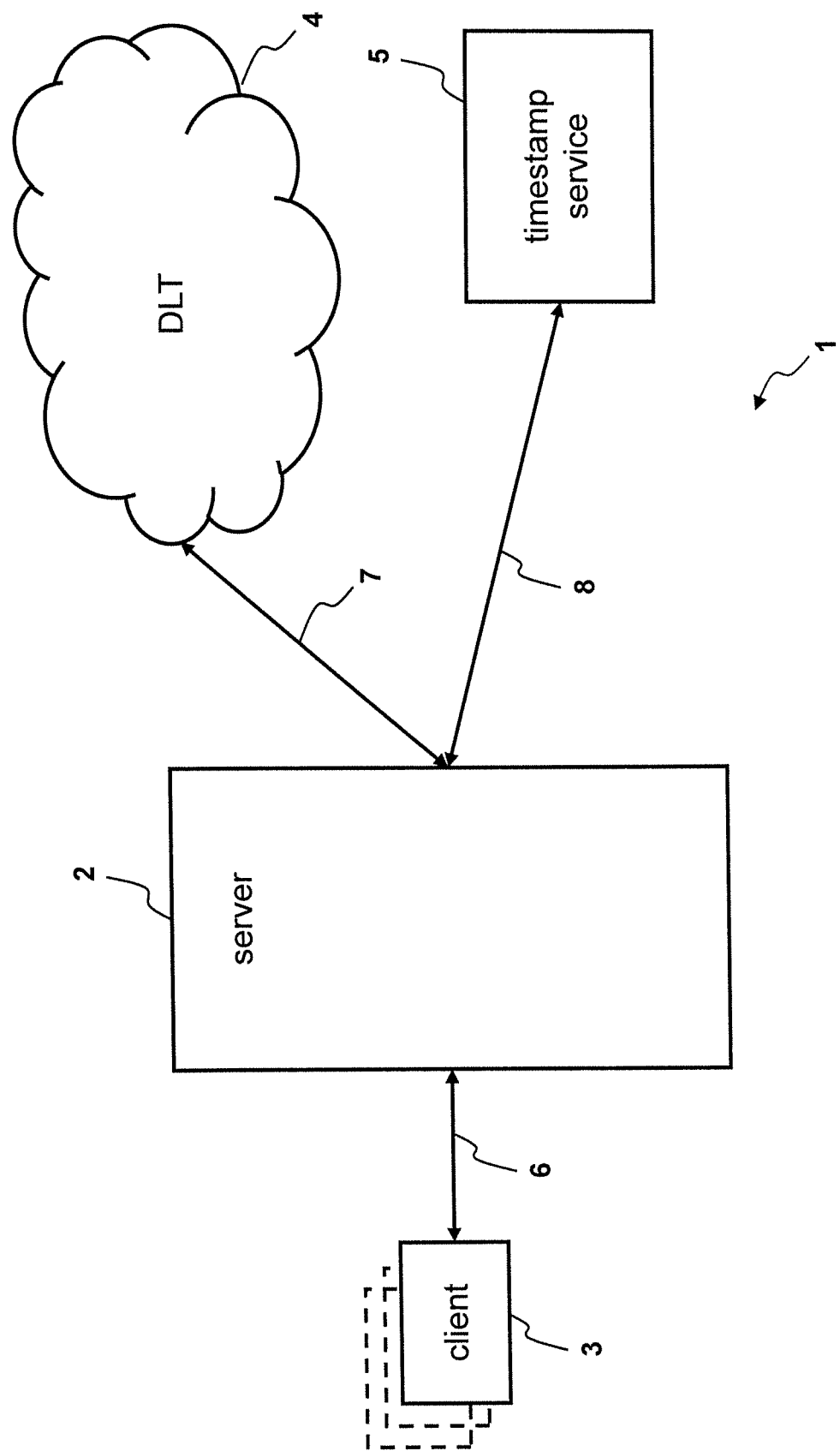
FIG. 1 schematically shows a system to implement the present methodologies.

The present disclosure relates to integrity-preserving document content processing and document-integrity verification. The term document as utilized herein encompasses any sorts, types, sizes of documents with any kind of structured or structurable document content. For example, the present disclosure processes documents with text fields and other content objects which are annotatable by known mark-up languages such as Hypertext Markup Language (HTML), JavaScript Object Notation (JSON), Extensible Markup Language (XML) and others. The documents may be present in files of any type such as Portable Document Format (PDF), text, image, web pages and/or others. A single document may include content of multiple types, possibly structured or structurable in hierarchical fields. A document may include sub-documents, e.g. a main document with one or more embedded additional documents. Non-limiting examples of documents are official document such as identity cards, passports, travel documents, vaccination passes, certificates, legitimations, and receipts. Documents may be the result of transactions, may be manually established, be officially issued by official authorities, or generated by prompting the user to enter content.

Generally, the mechanisms described herein are adapted to store one document or multiple documents. For example, one document is processed and stored at a time, while further documents are processed and stored in subsequent iterations. Alternatively, multiple documents are processed and stored in a single iteration. The present methodologies provide functionalities such as proof of existence of the document and proof of integrity of the document, proof of existence and integrity of the document with redacted or hidden content, revocation of the document, proof of ownership by way of one or more signatures, as well as revocation and corresponding proof of exclusion (revocation or non-existence) of the document or document content, which go beyond presently employed integrity-preserving storage mechanisms.

The present mechanisms include multiple individual functions or activities which are provided by a multi-layer protocol including at least two layers, in some embodiments three layers. At a first layer, logically at the bottom of the multi-layer protocol stack, functions of document structuring and hash value calculations representing the content of the document are located. The first layer is also referred to as commitment layer hereinafter as the functionalities of the first layer serve to commit a document to the integrity-preserving storage. At a second layer, logically on top of the first layer, functions of local blockchain-like registration are provided. The second layer is also referred to as blockchain layer hereinafter. At a third layer, logically on top of the second layer, includes proof-related functions. In embodiments with a third layer, the third layer comprises remote registrations of elements of the second layer in a decentralized blockchain or a central timestamp service. The third layer is also referred to as proof layer hereinafter.

For reasons of brevity, a situation is discussed in which a single new document, referred to as the first document, is to be processed and validated. The first document, as well as any other document to be processed and validated, contains document content in form of at least one data object. A data object is, for example, a field such as a name field, a zip code field, a city field, an address field, a birthday field, a free-text field. A data object may also be another element beyond text such as a barcode, a QR code, a picture, any other embedded multimedia object. In practice, the first document usually contains multiple data objects such as multiple data fields, potentially structured over multiple field hierarchy levels.

General aspects of the present disclosure concern processing the document at the first layer, i.e. the commitment layer, to generate multiple hash values, as follows. Optionally a document hash value is generated over the first document. The document hash is also referred to as the fourth hash value herein. For example, if the first document is a PDF file, the document hash value is a hash value of the PDF file. Any suitable and appropriately secure hashing algorithm may be employed to generate the document hash, e.g. KECCAK-256 (which is standardized in 3GPP TS 35.231 for mobile telephony and in NIST standards FIPS 202 and SP 800-185) or an SHA (Secure Hash Algorithm) such as SHA-256.

Furthermore, a data object hash value is generated over the at least one first data object and given random data associated with the at least one first data object. The data object hash value is also referred to as first hash value herein. In embodiments, as explained in more detail below, at least a number of data objects of the first document or even each data object of the first document, such as each field, is associated with a random piece of data, such as a salt (i.e. random data that is used as an additional input to a one-way function that hashes data, a password or passphrase). Adding salts to the data objects prevents dictionary attacks, in particular, if the data fields of the documents have a limited number of content options (e.g. gender: male, female, diverse). The first hash value may be generated by calculating intermediate hash values for each pair of data object plus salt and then by generating the first hash over the intermediate hash values. Again, any suitable hashing algorithm may be employed to generate the intermediate hash values as well as the data object hash value such as SHA (including SHA-256) or KECCAK-256. As explained further below, the data object hash may facilitate verifying an at least partially redacted content of the first document against the originally stored (non-redacted) content of the first document. The data object hash serves as a document content fingerprint for the parts of the content of the first document which is included in the generation of the data object hash value.

Optionally, the first hash value is also generated over the document hash value and given random data (salt) associated with the document hash value. In such embodiments, the document hash value and the associated salt is concatenated and a further intermediate hash value is calculated for the document hash. The first hash value is then generated over all the intermediate hash values stemming from the data objects and the document hash.

The commitment layer also utilizes a hash tree, also known as Merkle tree. A hash tree is a binary tree in which every leaf node is labelled with the cryptographic hash of a data block (here: document fingerprint, i.e. the first hash value or data object hash value). Every non-leaf node is set to the cryptographic hash of the hash values of the child nodes of the non-leaf node, usually by concatenating two child nodes and calculating the hash of the concatenation. Hash trees allow efficient and secure verification of the contents of documents, specifically provide the computation-wise efficient possibility of a proof of inclusion of proof of existence.

More specifically, the commitment layer utilizes a sparse hash tree, i.e. a sparse Merkle tree. A sparse hash tree is a hash tree in which the leaf nodes are indexed, i.e. each datapoint (here: the first hash value) is placed at the leaf node that corresponds to the index of the datapoint. Consequently, all leaf nodes that are not (yet) set to a corresponding data point are empty or, more precisely, set to null. For example, if a 256 bit hashing algorithm such as SHA-256 is utilized to generate the first hash value, the resulting hash values have a length of 256 bits. Correspondingly, the sparse hash tree includes $2^{256}$ leaf nodes and the generated first hash value is set to the leaf node of the sparse hash tree corresponding to the value of the first hash value. In addition to hash trees, the sparse hash tree provides the possibility of a proof of exclusion, namely by determination that the leaf node corresponding to a particular hash value is null.

Although sparse hash trees can become huge, e.g. the case of $2^{256}$ leaf nodes, efficient storage mechanisms may be employed to keep memory requirements and computational resources at reasonable levels. Due to the sparse nature of the sparse hash tree, a significant part of the leaf nodes may remain null, especially as parent nodes of two null childs are again null. Thus, areas with consecutive null leafs yield null nodes at higher hierarchy levels of the sparse hash tree. Instead of explicitly storing indications of null nodes, indications of such larger null areas may be defined and stored, so that most of the memory is only required to store non-null tree nodes of the sparse hash tree.

Furthermore, still at the commitment layer, in response to setting the data object hash value as a leaf node of the sparse hash tree, an updated root of the updated sparse hash tree is calculated. As explained above, this is effected by concatenating the data object hash value in the set leaf node of the sparse hash tree with its sibling through the levels of the sparse hash tree until the root node is reached. As any one of the nodes of the sparse hash tree, also the updated root node is a hash value. Again, the hash value calculation is performed according to a given hashing algorithm such as SHA-256. Thus, the result of the commitment layer is a root value of the sparse hash tree that reflects the registration of the first document in form of its fingerprint, i.e. the data object hash value, being a leaf node of the sparse hash tree.

The updated root value of the sparse hash tree is passed to the second layer, the blockchain layer. Generally, the functionality of the blockchain layer register the updated sparse hash tree with the registered first document as described above by way of the updated root of the updated sparse hash tree onto a chain of blocks. The updated sparse hash tree root is included in a block which is associated with a previous block of the blockchain layer, forming a blockchain-like chain of associated blocks.

More specifically, the functions of the blockchain layer include generating one or more digital signatures of at least the updated root of the updated SMT using at least one private key of an author of the first document. The updated root of the updated sparse hash tree and the digital signature(s) of the updated root signature are added to a block, hereinafter referred to as the current block (a previous block may have been created for registering a previous document, while subsequent blocks may be created for registering subsequent documents). The current block comprises a second hash value over at least the existing root of the existing SMT and a digital signature(s) of the existing root of the existing sparse hash tree, i.e. in the previous version before the update by setting the leaf node with the data object hash as explained before.

Moreover, functionalities of the blockchain layer include generating a third hash value over the updated root of the updated SMT, the digital signature(s) of the updated root of the updated SMT and the second hash value stemming from the previous block. The third hash value may become part of a next block of the blockchain layer to register a further document. The second hash value and the third hash value are also referred to as block hash values as the second and third hash value are created over entire respective blocks to constitute a link between the blocks of the blockchain layer. While the second hash value is the fingerprint of a previous block and associates the previous block with the current block, the third hash layer is the fingerprint of the current block and associates the current block with a next block.

In embodiments, optionally, the present protocol includes still the third layer which provides external registration of the third hash value (block hash value of the current block) and thus an additional possibility to verify the authenticity and integrity of the content of first document that is reflected in the data object hash value, i.e. the first hash value. The third layer is therefore also referred to as proof layer. At the third layer, the third hash value is registered (anchored) in at least one of a blockchain and a timestamping service. Non-limiting examples of blockchains are the Bitcoin or the Ethereum network. Non-limiting examples of the timestamping service are Time Stamping Authorities (TSA) in the sense of RFC 3161. Timestamping on a blockchain provides decentralized registration, while registering with a timestamping service effects a centralized registration. The third hash value may also be stored or registered in multiple blockchains and/or multiple timestamping service.

A schematic information technology (IT) system 1 for implementing the present functionalities is shown by FIG. 1. The IT system 1 includes, inter alia, a server 2 which implements at least a part of the functionalities of the commitment layer, of the blockchain layer and, if existing, of the proof layer. The server 2 may offer the presently described integrity-preserving storage and verification functionalities as a central service for any client 3 and corresponding user. The IT system 1 further include one of multiple client machines, briefly referred to as client 3. The client 3 is a user device, for example an IT device of an author of the first document. Non-limiting examples of the client 3 are a personal computer, a laptop, a mobile device, a server, or the like. The client 3 and/or the server 2 are utilized to generate or edit the first document. For example, an initial version of the first document is stored on the server and the client 3 is prompted to input data for the one or more data objects. In other use cases, the server 2 may issue the first document and the client 3 is utilized to view or locally store the first document.

Optionally, the IT system 1 includes one or more distributed ledger technology (DLT) systems 4, i.e. one or more remote blockchain networks, and/or one or more timestamp services 5. In practice, additional clients, databases and/or computation modules as well as other nodes (e.g. servers, routers, switches, etc.) may be present.

The elements of the IT system 1 of FIG. 1 are communicatively coupled by one or multiple communication networks which are utilized to implement communication interfaces between the elements, including a client-server communication interface 6, a server-DLT communication interface 7 and a server-timestamp service communication interface 8. The communication interfaces 6, 7, 8 are realized by network protocols located on various layers of the OSI reference model. The communication networks may include one or more of a wired network, a wireless network, a local area network, a wide area network, and the Internet. A part of the communication interfaces 6, 7, 8 may be implemented by way of a mobile communication network such as a 3G/4G/5G network according to ETSI/3GPP specifications and/or a Wi-Fi/WLAN network according to IEEE specifications.

Figure 2:
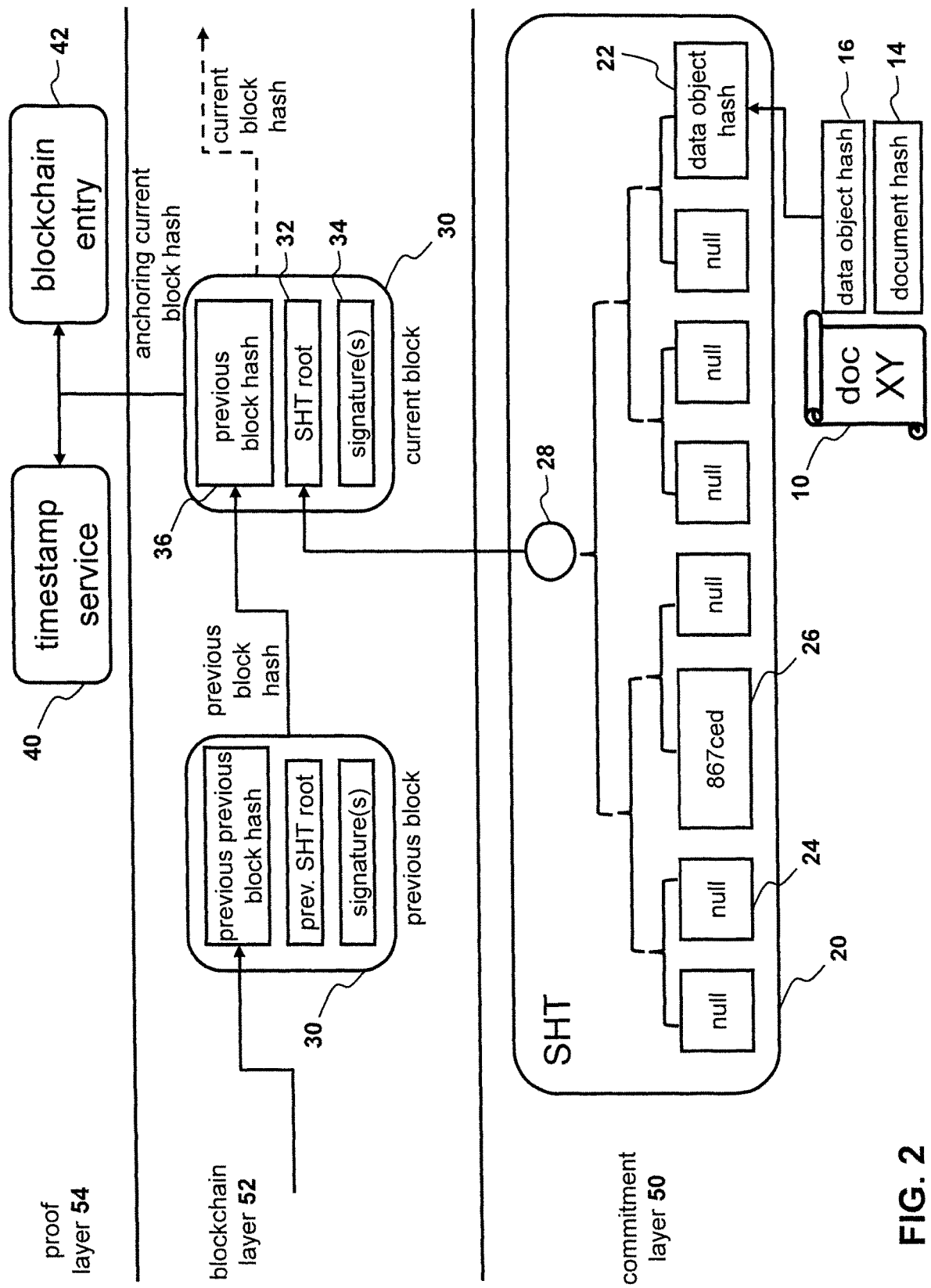
FIG. 2 represents a three-layer model with respective data structures and processes located on the layers.
Figure 3:
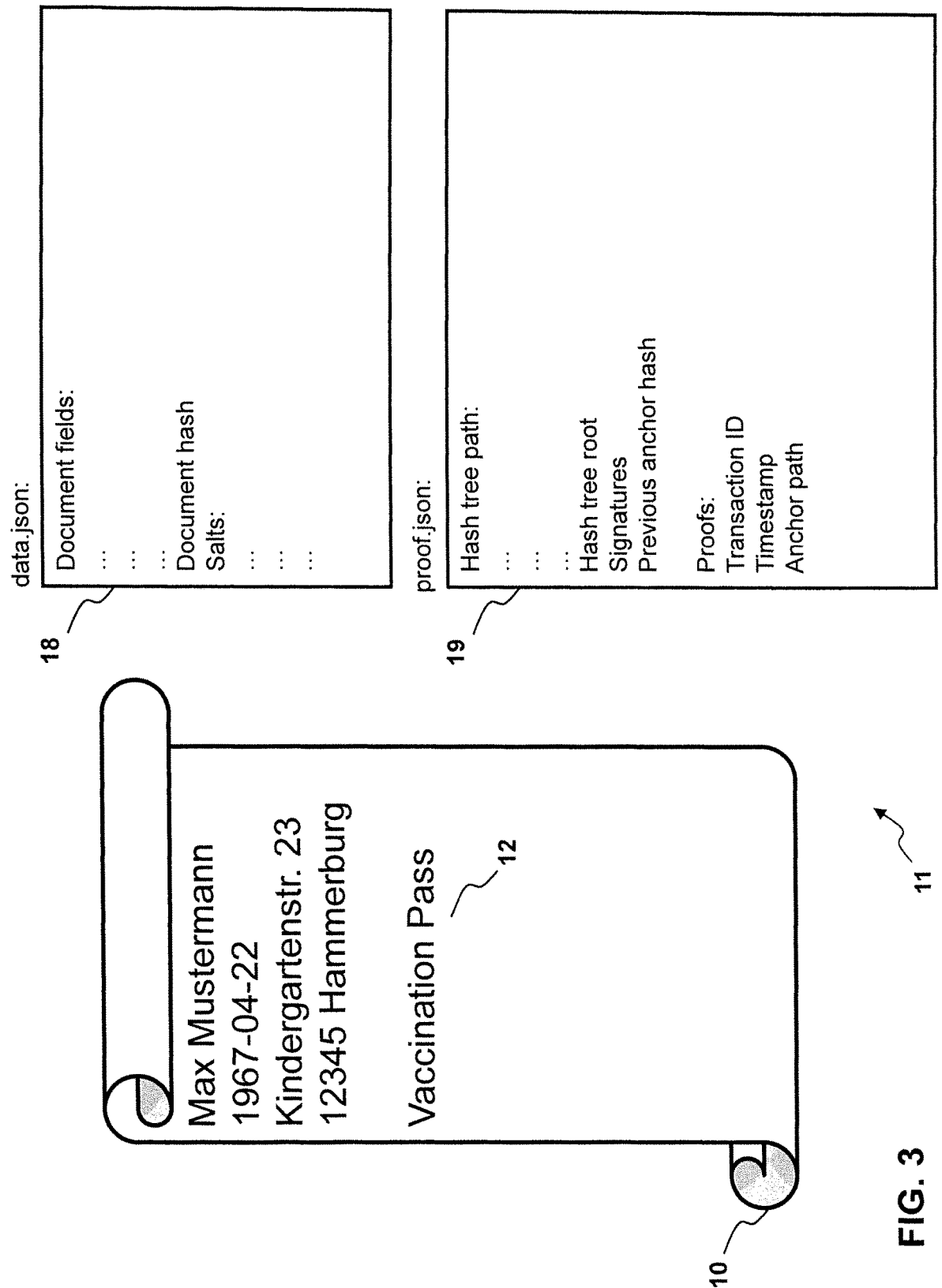
FIG. 3 illustrates an example document and files implementing the first and second layer of FIG. 2.

Now turning to FIG. 2, also with reference to FIG. 3, functional aspects of the multi-layer protocol described herein are schematically visualized. FIG. 2 shows the three layers as introduced above, namely the commitment layer 50 (=first layer), the blockchain layer 52 (=second layer), and the optional proof layer 54 (=third layer).

The first document 10 ("doc") is, for example, a Word document, a PDF document, an HTML document, a document of a proprietary data format used by a particular application, etc., with some content ("XY"). As mentioned above, the content is structured or structurable into one or more data objects such as data fields 12 (cf. FIG. 3), by way of a machine-readable markup language such as XML, JSON, HTTP, and the like. In a non-limiting example, the document 10 is a vaccination certificate with content that is definable into data fields as follows:

"firstName": "Max",
"lastName": "Mustermann",
"dateOfBirth": "1967-04-22",
"diseaseTargeted": "COVID-19",
"vaccine": "Comirnaty",
"vaccineType": "SARS-CoV-2 mRNS vaccine",
"manufacturer": "Biontech Manufacturing GmbH",
"numberInASeriesOfVaccinations": "2 of 2",
"dateOfVaccine": "2021-07-21",
"memberStateOfVaccination": "Germany",
"certificateIssuer": "Robert-Koch-Institut",
"uniqueCertificateIdentifier": "e76d82f2-4445-4216-9a4f-5fb12bca364b"

The initial document 10 may have a pre-defined structure of the data fields specified by respective meta data ("firstName", "lastName", and so on), while the user data may be inserted at document generation time, e.g. by prompting the client 3 to provide the data. The functionalities of the commitment layer 50 can be initiated once the document 10 is complete. Processing the document may also include a file type conversion, such as exporting a Word file to PDF or transferring the user data into a further file with structured data objects such as a JSON file or an XML file (such as the first file 18, as explained further below).

Commitment layer functionalities include generation of the document hash 14. A suitable hashing algorithm such as SHA-256 is run over the completed document 10, e.g. the exported PDF document. For example, the document hash 14 for the aforementioned exemplary vaccination certificate may look like (in hexadecimal notation):

"documentHash":
"97d4ad19dd6af852df40a377e6a6398a4514f6edd602556ff997ef55673d7dee"

Furthermore, the data object hash value 16 is calculated, preferably over pairs of a data object and a corresponding salt as well as the document hash 14 and a corresponding salt. In the aforementioned vaccination certificate example, the salts may be defined as:

"salts": {
  "documentFields": {
    "firstName":
"9407d13eab442ab5e934c74fbbfcb6b3d8ec0d9b3a7a7594d1e4170123cee982", "lastName":
"1f5f5565024ef242493b13a375be492d4963344f15e8597178b121f957065c3f", "dateOfBirth":
"22791eb98608867d69d5e81f5af5dd36920642c820d73c58c1db0c6807bcf4cb", "diseaseTargeted":
"68dbda72fcb67c0bb98a734023d374555e99284bc1815612880ababb1f052c72", "vaccine":
"1b02752dda4ef8d8ad8590ac426bffec610ba72a115457d8d9f700e2a197d05b", "vaccineType":
"af71caddfd66497b1ec05225fb2910bd5522351acbb3f774f1aece44d1b0ecc0", "manufacturer":
"59dc48ec429a2a80a19e66200bdf57590e43369b2717068b44e97e6f77879597", "numberInASeriesOfVaccinations":
"95d5f0e0d4eb5bd8ecf3e2518bc0dacbfe588d158ed9a8428dc9b9f0613d3e3b", "dateOfVaccine":
"7bbf878aa20eccc31ee5546c35d70534c87abf04b6d52e07881a24cf2d6977ff", "memberStateOfVaccination":
"7d129544f95ae6ec7b98429c81346194c5ad24105f8acbeaf4aaa4ee50ca057d", "certificateIssuer":
"80df625879bca8d9080d649bc67dbaf9821a6253f23a162351da53d4081c476d", "uniqueCertificateIdentifier":
"9e66f55a5499f44fb63b9d92148157a3d18cb3eedb6c73b34e9786779185468d"
  },
  "documentHash":
"212b61e4ffccff01809e702d0c0bf39d1534a7d5167a0edd6a87d73dc0b81ce8"
}

To calculate the document object hash value 16, a data field and corresponding salt pair is concatenated and an intermediate hash value over the concatenated pair is generated (e.g. by SHA-256). The same is done for all data fields concerned as well as, optionally, for the pair of the document hash value 14 and the corresponding salt. The intermediate hash values are again concatenated and the document object hash value 16 is obtained by hashing over the concatenated intermediate hash values. More specifically, as the data objects and data fields of the document content generally form a tree structure with one or multiple hierarchy levels, in embodiments, intermediate hash values of data fields at the same level of the document content hierarchy may be concatenated and hashed to result in the data object hash value 16. For example, a data field may be specified as an array with multiple values, each of the multiple values forming a first document content hierarchy level, while the array and other data fields at the same document content level form a second hierarchy level above the array values. Concatenation and hashing are performed for each level of the hierarchy of the document content.

Data object hash value generation also assumes an order and structure of the data objects or data fields, e.g. in accordance with given order criteria (e.g. a predetermined sequence of the data fields at each level of the document content hierarchy) and/or a given normalization structure. Hence, to calculate the data object hash value 16, the data objects may be sorted according to the given order and brought into the given normalized structure and form. In the aforementioned example of a vaccination certificate such as the document 10, the document object hash value 16 is obtained by concatenating all intermediate hash values (as all data fields are located on the same document content hierarchy level) in the given order of the data objects as set out above and may be given by:

"hash":
"2868fc417d5a68f872130de10788e71f7f47e758d61ae7ab7ece5658106842ed"

In embodiments, the structured user data and the protocol data obtained up to this point (document hash value 14, document objects, salts, document object hash value 16) are kept and stored in a first structured file 18 such as a JSON file, in the example of FIG. 3 referred to as data.json. For the given vaccination certificate example, the file data.json looks like that:

{
  "data": {
    "documentFields": {
      "firstName": "Max",
      "lastName": "Mustermann",
      "dateOfBirth": "1967 Apr. 22",
      "diseaseTargeted": "COVID-19",
      "vaccine": "Comirnaty",
      "vaccineType": "SARS-CoV-2 mRNS vaccine",
      "manufacturer": "Biontech Manufacturing GmbH",
      "numberInASeriesOfVaccinations": "2 of 2",
      "dateOfVaccine": "2021 Jul. 21",
      "memberStateOfVaccination": "Germany",
      "certificateIssuer": "Robert-Koch-Institut",
      "uniqueCertificateIdentifier": "e76d82f2-4445-4216-9a4f-5fb12bca364b"
    },
    "documentHash":
"97d4ad19dd6af852df40a377e6a6398a4514f6edd602556ff997ef55673d7dee"
  },
  "salts": {
    "documentFields": {
      "firstName":
"9407d13eab442ab5e934c74fbbfcb6b3d8ec0d9b3a7a7594d1e4170123cee982",
      "lastName":
"1f5f5565024ef242493b13a375be492d4963344f15e8597178b121f957065c3f",
      "dateOfBirth":
"22791eb98608867d69d5e81f5af5dd36920642c820d73c58c1db0c6807bcf4cb",
      "diseaseTargeted":
"68dbda72fcb67c0bb98a734023d374555e99284bc1815612880ababb1f052c72",
      "vaccine":

"1b02752dda4ef8d8ad8590ac426bffec610ba72a115457d8d9f700e2a197d05b",
"vaccineType":
"af71caddfd66497b1ec05225fb2910bd5522351acbb3f774f1aece44d1b0ecc0",
"manufacturer":
"59dc48ec429a2a80a19e66200bdf57590e43369b2717068b44e97e6f77879597",
"numberInASeriesOfVaccinations":
"95d5f0e0d4eb5bd8ecf3e2518bc0dacbfe588d158ed9a8428dc9b9f0613d3e3b",
"dateOfVaccine":
"7bbf878aa20eccc31ee5546c35d70534c87abf04b6d52e07881a24cf2d6977ff",
"memberStateOfVaccination":
"7d129544f95ae6ec7b98429c81346194c5ad24105f8acbeaf4aaa4ee50ca057d",
"certificateIssuer":
"80df625879bca8d9080d649bc67dbaf9821a6253f23a162351da53d4081c476d",
"uniqueCertificateIdentifier":
"9e66f55a5499f44fb63b9d92148157a3d18cb3eedb6c73b34e9786779185468d"
},
"documentHash":
"212b61e4ffccff01809e702d0c0bf39d1534a7d5167a0edd6a87d73dc0b81ce8"
},
"hash":
"2868fc417d5a68f872130de10788e71f7f47e758d61ae7ab 7ece5658106842ed"
}

Note that the first part of the first structured file 18 ("data") may be provided by the author or authorized issuer of the document. In this way, it is ensured that the content in the "data" part of the first file 18 corresponds to the respective content of the original document 10.

The calculated data object hash value 16 is set as the hash value of the corresponding leaf node 22 of the sparse hash tree 20 (SHT, also referred to as sparse Merkle tree). A very initial version of the sparse hash tree (genesis SHT) entirely consists of null nodes, including a null SHT root. The sparse hash tree of FIG. 2 is shown to include the fingerprint (data object hash value) of the first document 10 as well as the fingerprint of a previously registered document (symbolic data object hash value "867ced") in leaf node 26. All other leaf nodes are still null nodes 24.

The sparse hash tree 20 has a root value 28 which is updated due to the change of the leaf node 22 concerned from previously being a null leaf node to the data object hash value 22. The SHT root 28 thus is updated by recalculating the root hash given the structure of the sparse hash tree 20. To this end, the sibling (leaf node left or right) of the leaf node 22 is concatenated with the leaf node 22 and again hashed. The same is done with each sibling (left or right) at higher level of the sparse hash tree, up to the root 28. Hence, the updated root represents the newly registered first document 10 in the sparse hash tree 20 and constitutes the final result at the commitment layer 50. The current state of the sparse hash tree 20 is stored in a database within the server 2 or accessible by the server 2 (FIG. 1).

Now referring to the blockchain layer 52, the blockchain layer 52 is given by a linked sequence of blocks 30, forming a pseudo-blockchain. The blocks respectively include the respective current version of the SHT root 28 representing the collection of the document content fingerprints currently registered with the sparse hash tree 20, a block hash value 36 (second hash value) being the fingerprint of the previous block 30 (i.e. a hash over the respective previous block) and thus linking the current block 30 with the previous block 30, and one or more signatures 34. The at least one signature 34 signs at least the SHT root value 32, optionally signs the SHT root value 32 and the block hash value 36 (second hash value), depending on the particular use case.

FIG. 2 shows a situation in which content of a further document was previously registered with the sparse hash tree 20. Hence, the data object hash value 16 of the further document 10 is shown to constitute second leaf node 26 representing further (earlier) document 10. The sparse hash tree 20 already has a leaf node 22 set with the first document object hash value of the previously stored document (note that the SHT shown by FIG. 2 is of schematic nature only, in the case of SHA-256 being the hashing algorithm employed, the SHT comprises $2^{256}$ leaf nodes running from index 0 to index $2^{256}-1$). The other leaf nodes apart from the previously set leaf node 22 and the currently set leaf node 26 are still null leaf nodes 24.

At the optional third layer, the proof layer 54, the new block hash value 36 is registered (anchored) with one or more timestamp services 40 and/or one or more DLT systems, i.e. one or more blockchain entries 42.

In embodiments, a second file 19 is set up which recites the data to proof inclusion of the first document 10 such as a JSON file, in the example of FIG. 3 referred to as proof.json. The file proof.json maintains the sparse hash tree information (the way through the SHT 20 from the leaf node 22 up to the root 28 to verify correctness of the hash values), the signature(s) 34, the second and third hash values (the previous and current block hash values 36), as well as the timestamp service 40 and/or blockchain 42 registration information for the fourth hash value on the third layer is as follows. With reference to the aforementioned vaccination certificate example, the file proof.json may include the following content:

"dataHash":
"2868fc417d5a68f872130de10788e71f7f47e758d61ae7ab7ece5658106842ed",
"inclusionProof": [
{
"direction": "Right",
"hash":
"e3b0c44298fc1c149afbf4c8996fb92427ae41e4649b934ca495991b7852b855"
}
],
"block": {
"merkleTreeRoot":
"54ac480619fbe7e099bfbffb0b9f74d379f6bb59f32baf13622d45731136df51",
"previousBlockHash":
"c765a3461348e17041c5877751c8be2eeb94c6c74bef928112e71565997f7dd8",
"signatures": [

-continued

```
"304502207f8c8b45d96fb39fb15a85b4d3ae2d12a8d9658b00088b3c642ecfdbe6f762b
8022100d5b3c66361def781b15a1debc5b9a4bc047cf7f64b18af8864330784aec1ecb7",
"30450220423bfb18c8d29223bdc7a1e490b1269d1c733c640a9eb1683b33af90228710
59022100e6e498f80b3016c8139986ccab44ee8d75bc04f17b0c2f4472632ed75eff2503
"
     ]
   },
   "blockHash":
"a9aabcc7e8acb0e4ff6a13c1f8719f802de8a2336de610fcce7d6d1effc45204",
   "blockProofs": [
     {
        "type": "TimestampBtcOpReturn",
        "status": "Confirmed",
        "transactionId":
"3d860c0d7db63f2b067ca61f03f93a47ac15902ad956991d8d7a17515fc4eb29",
        "timestamp": "2021-08-15T17:10:41",
        "anchorPath": [
          {
            "direction": "Right",
            "hash":
"a9aabcc7e8acb0e4ff6a13c1f8719f802de8a2336de610fcce7d6d1effc45204"
          },
          {
            "direction": "Right",
            "hash":
"2023525e85093ef31050a9a8e87f3632c27a2aa401430468b8a48aac92816d1e"
          },
          {
            "direction": "Left",
            "hash":
"50387df5a3939cae6830284f9fe100a69b3b36e01b1c1ed92681ad520aaa93e7"
          },
          {
            "direction": "Right",
            "hash":
"1a9178e836f14c9e26370742d27a5926261a26d45127f8d1b3f28ec8c6e33a10"
          },
          {
            "direction": "Left",
            "hash":
"61d05f56fe30ba49d970123de48dbdc5920af1822b60ef1cbf107935e0fc5bc5"
          },
          {
            "direction": "Right",
            "hash":
"cdc0b7a243a5a27e9ab0ba9b6eacae0f36978282173cf1c15380a43e9e003232"
          },
          {
            "direction": "Left",
            "hash":
"ec687d4a3346974ffe1e563ae6d505549692a33583162345e3fbff35d6b751d7"
          },
          {
            "direction": "Left",
            "hash":
"c68a3df5ad89633e18969f9c42233e78919ed62996771ed95343ba5f22427b21"
          },
          {
            "direction": "Right",
            "hash":
"2dd280731fc108bfb85d4daa3882f691fe45985df2d138006b63f984909bff1e"
          },
          {
            "direction": "Left",
            "hash":
"f068ed8c1dbd4d59c5b0b6a1e0d91ab04efab77083bbe1edb0279d46ea1877bf"
          }
        ]
     }
   ]
}
```

In embodiments, document processing at the first layer comprises generating a first-layer markup language file containing the content to be integrity-preserved, i.e. the at least one data object, the given random data, and the first hash value and, optionally, the document hash value (fourth hash value) and attaching the first-layer markup language file to the first document. As mentioned above, the at least one first data object may include multiple data fields and the associated given random data comprises multiple random data fields (salts) respectively corresponding to the multiple data fields and, optionally, to the document hash value. Moreover, in embodiments, processing the first document at the second layer comprises generating a second-layer markup language file containing the first hash value, SHT structure data specifying a structure of the updated SMT, the updated root of the updated SHT, the digital signature(s) for the updated root, the second hash value (previous block hash) and the third hash value (current or new block hash), and attaching the second-layer markup language file to the first document. An exemplary visualization of these embodiments with the two files is given by FIG. 3. The first file 18 specifies the document content to be registered with the protocol described herein and results of the commitment layer (data.json 18), while the second file 19 specifies the verification data (proof.json 19). Both files are appended to the first document 10, resulting in a document bundle 11 that allows verification of the integrity of the first document 10 against the data obtained from the activities on the commitment layer 50, the blockchain layer 52 and the proof layer 54 as described above.

The overall structure shown by FIG. 2 provides an efficient and effective mechanism to safeguard the content integrity of the stored first document 10. Employing random data such as salts provides a protection against dictionary attacks. Including the data object hash value 16 in the document registration offers the possibility of integrity verification of a (partially) redacted version of the first document 10. The sparse hash tree 20 of the commitment layer offers the possibility to verify absence of the first document 10, i.e. integrity-preserving storage of the first document 10 can also be revoked again at a later point of time. The linked blocks of the blockchain layer 52 provide a computation-wise efficient verification option because a registration in a DLT (such as the Bitcoin or the Ethereum blockchain) with its overhead is rendered to become an optional additional layer of proof. Still, the latter one and/or a timestamp service 40 may be added on top to provide additional security. Hence, the overall framework is also inherently flexible as different use cases and varying levels of security can be addressed.

Figure 4:
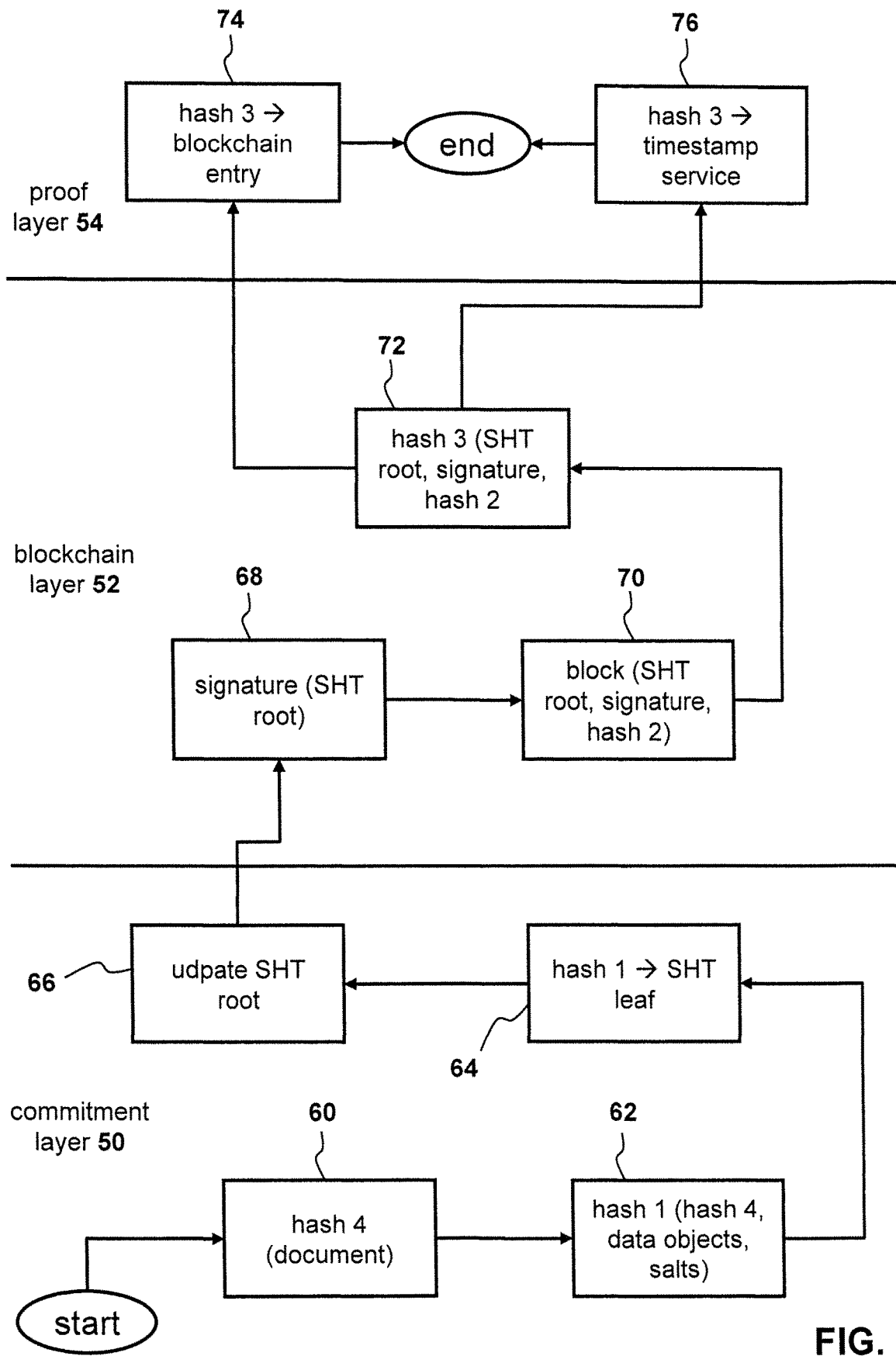
FIG. 4 visualizes the present methodologies by way of a flowchart.

FIG. 4 depicts a flow-chart with a number of activities on the various layer of the protocol described herein to realize the present mechanisms. At the commitment layer 50, optionally, the document hash value (fourth hash value) is generated 60 over the first document. Next, the first hash value is generated 62 over the fourth hash value (optional), the data objects and the salts as described above. The first hash value is then set 64 as the corresponding leaf node of the sparse hash tree. The value of the newly set leaf node is propagated upwards through the sparse hash tree, resulting in an update 66 of the root node of the sparse hash tree.

At the blockchain layer 52, the at least one signature is calculated 68 over at least the updated sparse hash tree root, optionally also over the second hash value, i.e. the block hash from the previous block. The signature is a digital signature that is generated by use of a private key of an asymmetric key pair of the author, editor or an authorized issuer of the document 10. The current block is then created 70 including the updated sparse hash tree root, the at least one signature and the second hash value linking the current block with the previous block. Next, the third hash value is generated 72 over the updated sparse hash tree root, the at least one signature and the second hash value, i.e. over the current block. As explained above, the third hash value will constitute the link to a subsequent block that facilitates registration of content of content of a further document.

At the proof layer 54, the third hash value is stored 74 as a blockchain entry 42 and/or registered 76 with a timestamp service 40. Corresponding registration data is stored in the second file 19.

Generally, the same flow of activities of FIG. 4 applies for any iteration, including initial, earlier, and subsequent storage a registration of content of a document, including other documents than the first document 10 described above with reference to FIG. 2, or other versions of the first document. These other iterations may store and register document content of the same author (e.g. university degree certificates of the same university) as well as document content by different authors.

Figure 5:
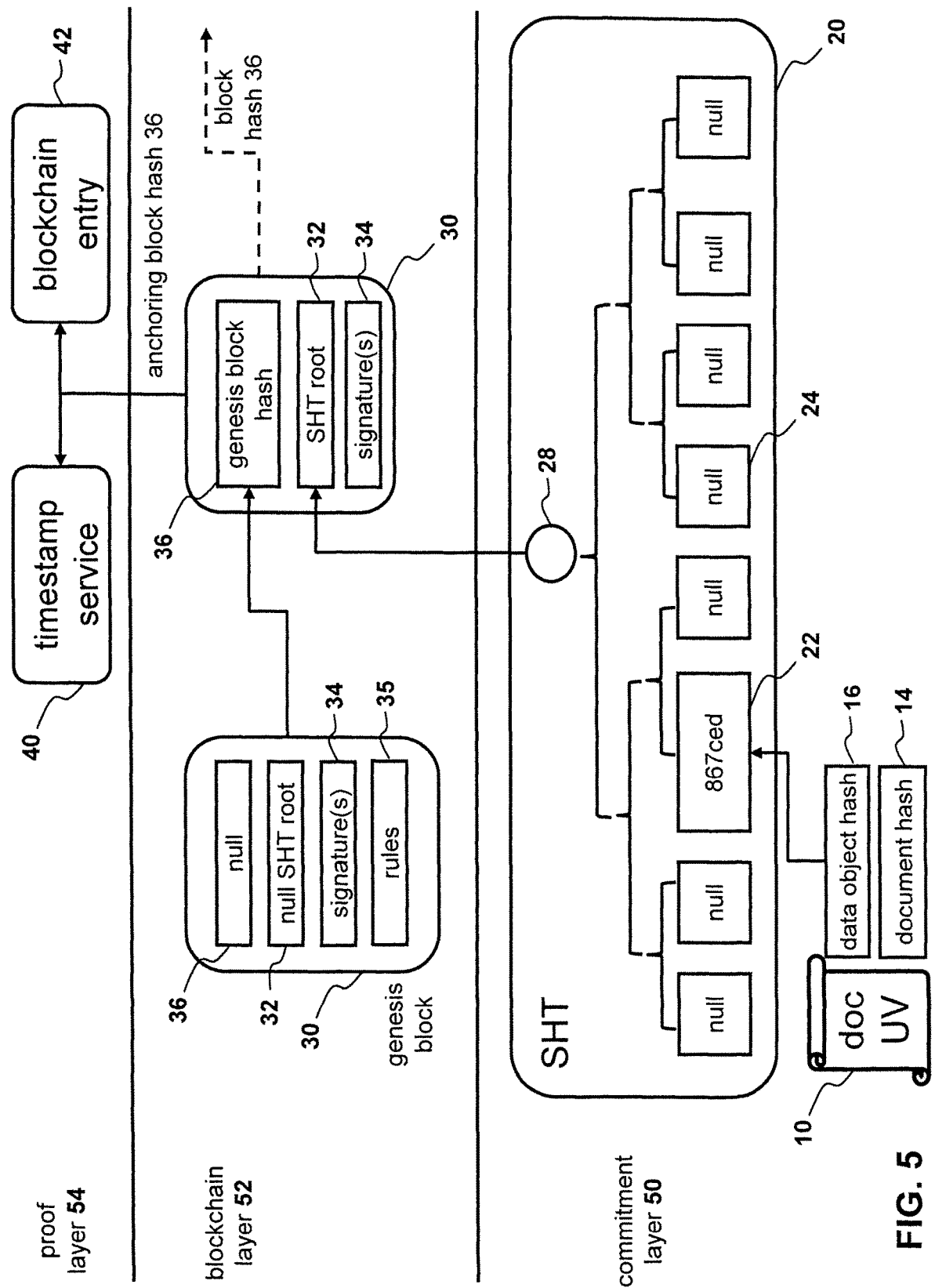
FIG. 5 shows a subsequent situation of registering a further document at a later point of FIG. 2.

In this regard, the example of FIG. 5 shows a situation of registering and processing an earlier document 10 (also referred to as second document herein), namely an initial document with some content ("UV") registered with the sparse hash tree 20. The data object hash value is symbolically denoted "867ced", while the leaf node of the first document (which will only be later registered in accordance with FIG. 2) is still a null leaf node 24 at this point of time. On the blockchain layer 52, the previous block 30 is a genesis block with the SHT root 32 and the previous block hash value 36 all being null since there is, at that point of time, no document content registered with the SHT and no previous block exists.

Hence, according to FIG. 5, the second document is processed prior to processing the first document, by comprising at the first layer, generating a fifth hash value (document hash value) over the second document, the second document including at least one second data object, generating a sixth hash value (data object hash value) over and the fifth hash value, the at least one second data object and associated given random data, setting the sixth hash value as a leaf nod to a previous SHT, calculating an updated root of the previous SHT, thereby forming the existing SHT, and at the second layer, generating at least one digital signature of at least the updated root of the existing SHT using at least one private key of an author of the second document, adding the updated root of the existing SHT and the at least one digital signature of the updated root of the existing SHT to a previous block, generating the second hash value over the updated root of the existing SHT and the at least one digital signature of the updated root of the existing SHT.

In embodiments, the genesis block includes further control data denoted as rules 35. The rules 35 specify protocol parameters such as users authorized to register content of documents with the SHT, one or more public keys of authorized users which are eligible to validly create signatures 34, a heartbeat interval specifying the maximum time between the generation of a new block 30, rules specifying how to validate document content with the data structures at the various protocol levels, and others. The rules 35 may be signed with a private key such as a root private key, resulting in a genesis block signature 34. Consequently, the block hash value 36 of the genesis block 30 is not null and forms the block hash value (second hash value) for the subsequent block 30 utilized for registering the second document 10. The new block hash value 36 resulting from the current block (third hash value) is not null as well, and reflects the triplet of the updated SHT root 32, signature(s) 34 and previous block hash 36. The current block hash value 36 resulting from the current block 36 will then constitute the block hash of a subsequent block 30 for registering a further document and content, respectively, such as the first document 10 (cf. FIG. 2).

The rules 35 may also be changed or updated at a later point of time. In this event, further block 30 with the updated rules is generated according to the methodologies described above and the signature 34 of this block 30 is created by way of the root private key as mentioned above. On the other hand, usual registrations of content of documents 10 utilize private keys derived from the private root key (forming an asymmetric key hierarchy, created by way of hierarchical deterministic key generation) as opposed to the root key itself. The rules 35 may e.g. specify which derived private keys of the asymmetric key hierarchy are eligible for creating the signature(s) 34.

Verification the integrity of the content of the first document 10 (or any other document 10 registered with the multi-layer protocol described herein) is generally performed in a similar manner as the registration procedures described above, e.g. by utilizing the data stored in the first file 18 and the second file 19 which hold the results of the storage and registration procedures at the various protocol layers. Verification may also be facilitated by way of the rules 35 which may be published to be accessible by any third party to perform verification activities. For example, the rules 35 may be published on a website together with the first file 18 and the second file 19, constituting a verification bundle with the data allowing verification of the content of the first document 10. For example, the rules 35 may be published on the website of the author/issuer and linked to author/issuer of the documents 10, e.g. by way of storing the rules and the public key(s) of the author/issuer in the /.well-known/-folder of the author's/issuer's web presence.

The first file 18 and second file 19 are detached from the document 10 to be verified. Then, the activities of FIG. 4 are performed and the outcome of the activities are compared with the corresponding data stored in the first file 18 and the second file 19. Hence, first, at the commitment layer 50, the document hash 14 of the document 10 is recalculated and compared with the document hash 14 stored in the first file 18. This activity is optional and performed depending on whether or not the document hash value 14 is included in the data object value 16. If this is not the case, the actual document 10 is not needed to verify the registered content of the document. The verification may then be performed with the first file 18 and with the inclusion proof data stored by the second file 19. If the document hash 14 is included in the data object hash 16, it is determined whether the recalculated document hash and the document hash value stored in the first file 18 are identical.

If affirmative or if this activity is omitted, the verification proceeds with calculating the data object hash 16 in the manner described above and comparing the result with the data object hash value 16 stored in the first file 18. If both are identical, the verification proceeds with traversing the sparse hash tree 20 according to the tree path specified by the second file 19 up to the SHT root 28. If the calculated SHT root value 28 corresponds to the SHT root value 28 specified by the second file 19, the verification proceeds to the blockchain layer 52. Accordingly, the signature(s) is/are calculated and compared against the signature(s) stored in the second file 19. Using the previous block hash from the previous block 30, the current block hash value 36 is calculated based on the signature(s) and the SHT root value 28 and can then be verified with the timestamping service(s) 40 and/or blockchain(s) based on the proof data specified by the second file 19. In the blockchain case, the corresponding blockchain is queried for the transaction and it is validated that the registered block hash value (third hash value) is part of the specified transaction. In the timestamping service case, it is checked that the timestamp stored in the second file 19 is valid. In practice, the timestamp is signed with a private key of the timestamping authority, and the validity of the timestamp may be check by verifying the digital signature using the corresponding public key of the timestamping authority 40.

Including representations of the data objects of the document 10 in the fingerprint registration in the sparse hash tree 20 by way of the data object hash 14 allows to verify the integrity of the document even if one or more data objects are redacted. For example, the user may want to avoid a publication of certain information included in the data fields of the document 10, such as his or her birthday, e.g. for reasons of data privacy. This may be of interest if the document 10 is not to be published, but only content of the document 10 or a part of the content of the document 10 is made publicly available, e.g. on the webpage of the user. Publication of the integrity-preserved content of the document 10 may occur by publishing the first file 18 (FIG. 3: data.json), while validation rules and data are published by way of the second file 19 (FIG. 3: proof.json). Any external person is thus enabled to utilize the two files data.json and proof.json and verify that the registered content of the document 10 is unaltered and valid.

With this setup, the content of the data objects 12 concerned can be redacted in the first file 18. In the first file 18, the data objects concerned and the corresponding salts are replaced by the intermediate hash values mentioned above. The verification of the document hash 14 is skipped in the verification procedure. Rather, the data object hash value 16 is verified by recalculating the data object hash value 16 based on the unredacted data objects and corresponding salts as well as the intermediate hash values of the redacted data objects as stored in the first file 18. The recalculated data object hash value 16 based on the unredacted data objects and corresponding salts as well as the intermediate hash values of the redacted data objects as stored in the first file 18 will be identical to the data object hash value 16 as stored in the first file 18 if the unredacted data objects and corresponding salts as well as the intermediate hash values of the redacted data objects as stored in the first file 18 have not been modified. An example of a version of the first file 18 with a number of redacted data objects may look like:

```
{
  "data": {
    "documentFields": {
      "firstName": "Max",
      "lastName": "Mustermann",
      "dateOfBirth":
"REDACTED3574db8ac0dac5799c73f5cf93cd95d
      c4aa74951f190ac10a6f36823 3968ce0c",
      "diseaseTargeted": "COVID-19",
      "vaccine": "Comirnaty",
      "vaccineType": "SARS-CoV-2 mRNS vaccine",
      "manufacturer": "Biontech Manufacturing GmbH",
      "numberInASeriesOfVaccinations": "2 of 2",
      "dateOfVaccine": "2021 Jul. 21",
      "memberStateOfVaccination": "Germany",
      "certificateIssuer": "Robert-Koch-Institut",
      "uniqueCertificateIdentifier":
"REDACTED1d9f6e3ebd52a9cfd6b8f636ff98f728
      4a8a79ab09e162387f43a0b20 2a9f6a6"
    },
    "documentHash":
"97d4ad19dd6af852df40a377e6a6398a4514f6edd60255
    6ff997ef55673d7dee"
  },
  "salts": {
    "documentFields": {
      "firstName":
```

"9407d13eab442ab5e934c74fbbfcb6b3d8ec0d9b3a7a75
94d1e4170123cee982",
"lastName":
"1f5f5565024ef242493b13a375be492d4963344f15e8597
178b121f957065c3f",
"dateOfBirth": "REDACTED",
"diseaseTargeted":
"68dbda72fcb67c0bb98a734023d374555e99284bc18156
12880ababb1f052c72",
"vaccine":
"1b02752dda4ef8d8ad8590ac426bffec610ba72a115457d
8d9f700e2a197d05b",
"vaccineType":
"af71caddfd66497b1ec05225fb2910bd5522351acbb3f77
4f1aece44d1b0ecc0",
"manufacturer":
"59dc48ec429a2a80a19e66200bdf57590e43369b271706
8b44e97e6f77879597",
"numberInASeriesOfVaccinations":
"95d5f0e0d4eb5bd8ecf3e2518bc0dacbfe588d158ed9a8
428dc9b9f0613d3e3b",
"dateOfVaccine":
"7bbf878aa20eccc31ee5546c35d70534c87abf04b6d52e0
7881a24cf2d6977ff",
"memberStateOfVaccination":
"7d129544f95ae6ec7b98429c81346194c5ad24105f8acbe
af4aaa4ee50ca057d",
"certificateIssuer":
"80df625879bca8d9080d649bc67dbaf9821a6253f23a16
2351da53d4081c476d",
"uniqueCertificateIdentifier": "REDACTED"
},
"documentHash":
"212b61e4ffccff01809e702d0c0bf39d1534a7d5167a0ed
d6a87d73dc0b81ce8"
},
"hash":
"2868fc417d5a68f872130de10788e71f7f47e758d61ae7a
b7ece5658106842ed"
}

Figure 6:
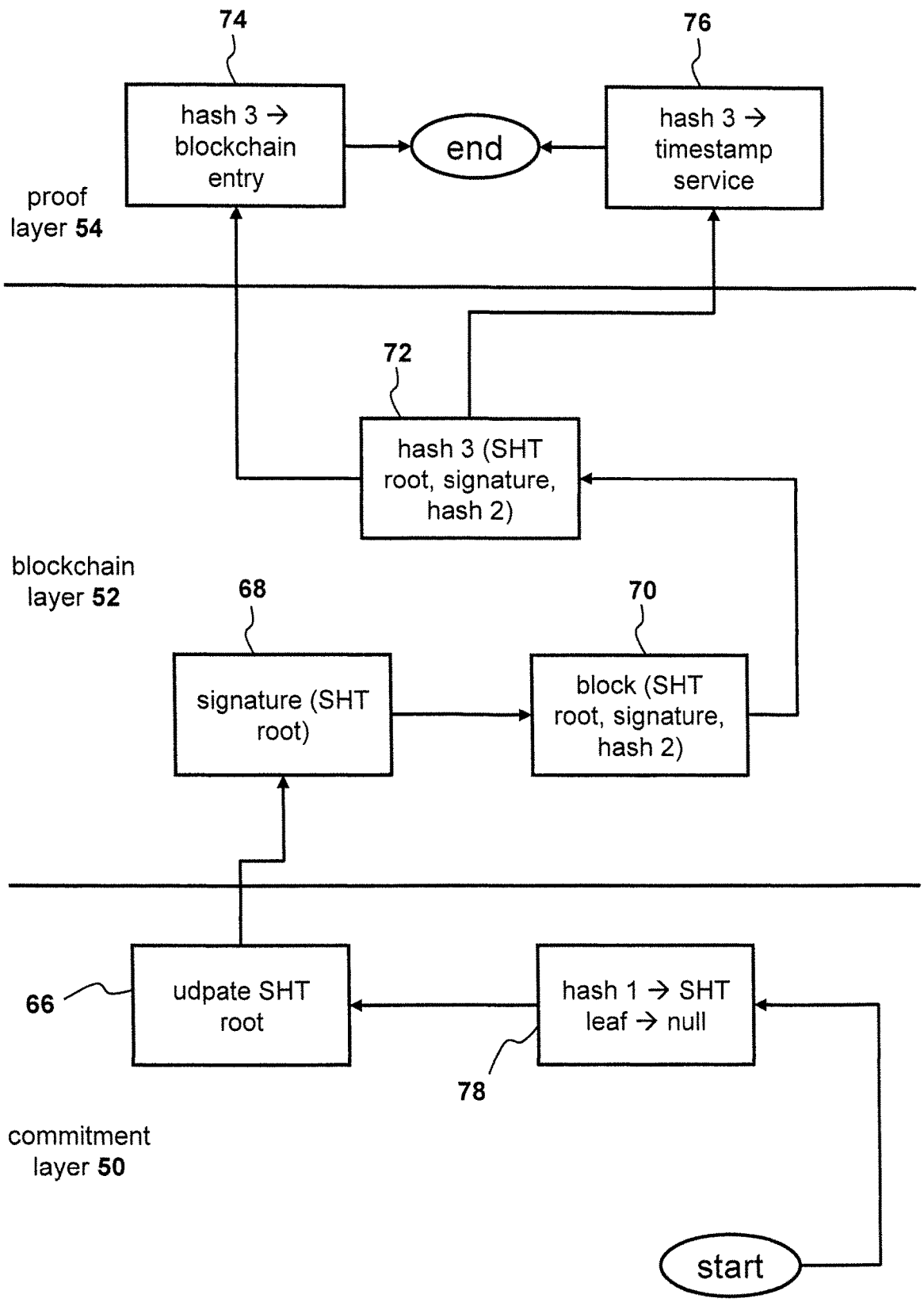
FIG. 6 visualizes a revocation of a document.

Moreover, in embodiments, the procedures analogous to FIG. 4 are employed to revoke storage and registration of the document 10. Revocation may occur e.g. due to a mistake from the document issuing authority or in case of a fraud, i.e. if the authenticity of the document 10 is in question from the outset. Revocation is facilitated by the utilization of the sparse hash tree with the leaf nodes being indexed. The data object hash 16 of the document 10 to be revoked is determined, e.g. by reading the data object hash 16 from the first file 18. The corresponding leaf node 22 (cf. FIG. 2) is then re-set 78 to null (FIG. 6), i.e. the fingerprint of the revoked document 10 is removed from the sparse hash tree 20. The remaining activities shown again by FIG. 6 correspond to those of FIG. 4. Hence, a new block 30 is created on the blockchain layer 52 that logs the revocation of the document 10 by way of the updated SHT root value 28 that reflects the deletion of the document's fingerprint from the sparse hash tree. A corresponding first file 18 and a second file 19 specifying the exclusion proof data are created and stored.

The absence of the revoked document 10 can then be verified by calculating the data object hash 14 of the revoked document 10 and determining that the corresponding leaf node of the sparse hash tree 20 is a null leaf node 24 (cf. FIG. 2). If the SHT leaf node is a null leaf node 24, it is proven that the document 10 is not registered with the sparse hash tree (exclusion proof). As a security measure to prevent unauthorized delays by hiding recent block of the pseudo-blockchain of the blockchain layer 52 from the verifier (delay attacks), the blockchain layer 52 may include a functionality to generate a new block 30 at least after a given time is lapsed (heartbeat), e.g. every two hours or every 24 hours. The heartbeat interval may be configurable and stored in the rules 35, as already explained above. In this way, it can be ensured that the latest version of the linked blocks 30 and the current block 30 (as opposed to a previous block) is utilized for any blockchain layer transaction. Hence, this allows to differentiate older blocks with a state before registration of the first document 10 from a later state after the first document 10 has been revoked.

While the foregoing specific document and content example relate to a vaccination pass, other use cases are envisaged. For example, a university may issue degree certificates to the graduates. The original certificates are issued e.g. as PDF files, while the relevant parts of the content of the certificates (e.g. personal data including name and birthday, name of the degree, courses and corresponding grades, date of issue, etc.) are also issued in form of the "data" part of the first file 18 (data.json). At the same time, the university, by inter alia utilizing the private key(s) of the university, registers the aforementioned content with the multi-layer protocol and provides the second file 19 with the inclusion proof data. The first file 18 and the second file 19 may then be published as a website (possibly with some content such as the birthday of the graduates and the grades redacted), to allow any third person to validate the correctness and integrity of the issued degree certificates. Generally, the present methodologies are independent from the actual content of documents to be registered.

The aforementioned aspects may be embodied as functionalities of a computerized platform or system such as or including server 2, in particular in accordance with the examples of FIGS. 1 to 6. Moreover, the aforementioned aspects may be provided in form of method activities performed by a computerized platform such as server 2. Likewise, the aforementioned aspects may be embodiment as a computer program that performs such activities when executed on a computerized platform (cf. FIG. 6) with corresponding characteristics, as well as a non-transitory storage medium storing computer program instructions of such computer program.

Figure 7:
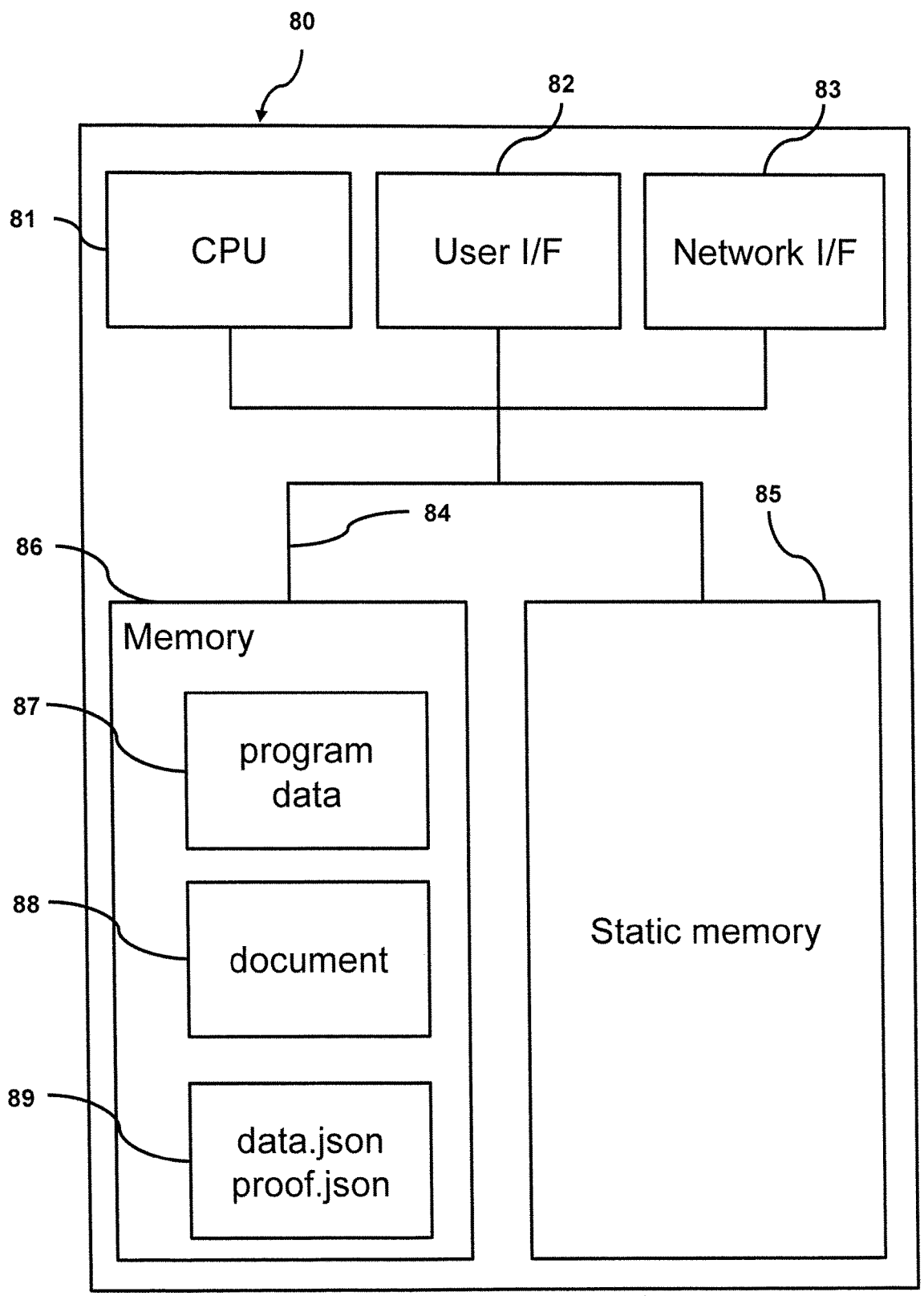
FIG. 7 depicts an internal structure of a computerized platform which realizes the mechanisms described herein.

FIG. 7 is a diagrammatic representation of the internal component of a computing machine 80 implementing at least a part of the functionalities of the multi-layer protocol as described in detail above. Both, the server 2 and the client 3 may employ the internal computing machine structure of FIG. 7. The computing machine 80 includes a set of instructions to cause the computing machine 80 to perform any of the methodologies discussed herein when executed by the computing machine 80. The computing machine 80 includes at least one processor 81, a main memory 86 and a network interface device 83 which communicate with each other via a bus 84. Optionally, the computing machine 80 may further include a static memory 85 and a disk-drive unit. A video display, an alpha-numeric input device and a cursor control device may be provided as examples of user interface 82. The network interface device 83 connects the computing machine 80 implementing the server 2 to the other components such as the clients 3.

Computing machine 80 includes a memory 86 such as main memory, random access memory (RAM) and/or any further volatile memory. The memory 86 may store temporary data and program data 87 to realize the functionality of the multi-layer protocol, including program data to realize the activities of FIG. 4 and FIG. 6 as described above. Also the first document (and other documents processed and stored) may be represented in a memory part 88 of the memory 86. The memory 86 may also store data constituting the integrity-preserving storage such as the files data.json 18 and proof.json 19 in memory part 89.

A set of computer-executable instructions embodying any one, or all, of the methodologies described herein, resides completely, or at least partially, in or on a machine-readable storage medium, e.g., in the static memory 85 or, when loaded and being executed, in the main memory 86. For example, the instructions may include software processes implementing the multi-layer protocol. The instructions may further be transmitted or received as a propagated signal via the Internet through the network interface device 83 or via the user interface 82. Communication within computing machine 80 is performed via a bus 84. Basic operation of the computing machine 80 is controlled by an operating system which is also located in the memory 86, the at least one processor 81 and/or the static memory 85.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. A computer-implemented method for integrity-preserving document processing, wherein each document to be processed comprises at least one data object, the method comprising:
at a first layer,
generating a first hash value over the at least one data object of a first document and associated random data;
setting the first hash value as a leaf to an existing sparse hash tree, SHT, with at least one existing leaf and an existing root, thereby forming an updated SHT;
calculating an updated root of the updated SHT;
at a second layer,
generating at least one digital signature of at least the updated root of the updated SHT using at least one private key of an author of the first document;
adding the updated root of the updated SHT and the at least one digital signature of the updated root signature to a current block comprising a second hash value over at least the existing root of the existing SHT and at least one digital signature of the existing root of the existing SHT;
generating a third hash value over the current block with the updated root of the updated SHT, the at least one digital signature of the updated root of the updated SHT and the second hash value.

2. The method of claim 1, further comprising, at the first layer, generating a fourth hash value over the first document, and wherein generating the first hash value comprises generating the first hash value over the fourth hash value and random data associated with the fourth hash value, the at least one first data object and the associated random data.

3. The method of claim 1, further comprising, at the second layer, storing the third hash value in a subsequent block for processing a further document, thereby linking the subsequent block to the current block.

4. The method of claim 1, further comprising:
at a third layer,
registering the third hash value in at least one of a blockchain and a timestamping service.

5. The method of claim 1 further including processing a second document prior to processing the first document by comprising:
at the first layer,
generating a fifth hash value over the second document, the second document including at least one second data object;
generating a sixth hash value over and the fifth hash value, the at least one second data object and associated random data;
setting the sixth hash value as a leaf nod to a previous SHT;
calculating an updated root of the previous SHT, thereby forming the existing SHT;
at the second layer,
generating at least one digital signature of at least the updated root of the existing SHT using at least one private key of an author of the second document;
adding the updated root of the existing SHT and the at least one digital signature of the updated root of the existing SHT to a previous block;
generating the second hash value over the updated root of the existing SHT and the at least one digital signature of the updated root of the existing SHT.

6. The method of claim 5, further comprising, at the second layer, storing the second hash value in the current block for processing the first document, thereby linking the current block to the previous block.

7. The method of claim 1, wherein processing the first document at the first layer comprises:
generating a first-layer markup language file containing the at least one data object, the corresponding given random data, and the first hash value;
attaching the first-layer markup language file to the first document.

8. The method of claim 1, wherein the at least one first data object comprises multiple data fields and the associated given random data comprises multiple random data fields respectively corresponding to the multiple data fields.

9. The method of claim 1, wherein processing the first document at the second layer comprises:
generating a second-layer markup language file containing the second hash value, SHT structure data specifying a structure of the updated SMT, the updated root of the updated SHT, the at least one digital signature for the updated root and the third hash value;
attaching the second-layer markup language file to the first document.

10. A method for document integrity verification, the method verifying the integrity of content of the first document processed according to claim 1 by comprising:
at the first layer:
re-generating the first hash value and comparing the re-generated first hash value with the generated first hash value;
in response to determining that the re-generated first hash value and the generated first hash value are identical, traversing the SHT to re-calculate the updated root of the updated SHT and comparing the re-calculated updated root of the updated SHT with the calculated root of the updated SHT;
in response to determining that the re-calculated updated root of the updated SHT and the calculated root of the updated SHT are identical,
at the second layer:
verifying the at least one digital signature.

11. The method of claim 10, wherein a number of the at least one data object is redacted and re-generating the first hash value is based on a respective intermediate hash value per redacted data object, the intermediate hash value having been obtained and stored during processing the first document based on the non-redacted data object and the associated random data.

12. The method of claim 1, further comprising revoking the first document by comprising:
at the first layer:
resetting the leaf node of the existing SHT to null, thereby forming a further updated SHT;
calculating a further updated root of the further updated SHT;
at the second layer,
forming the subsequent or a further subsequent block by repeating the second layer procedures of any one of claims 1 to 11.

13. A computing device for integrity-preserving document processing, the computing device being arranged to perform the method of claim 1.

14. A computer program including program instructions which, when executed by a computing device, makes the computing device execute the method of claim 1.

* * * * *